United States Patent
Fujii

(10) Patent No.: US 10,734,883 B2
(45) Date of Patent: Aug. 4, 2020

(54) MOMENTARY-VOLTAGE-DROP COMPENSATION APPARATUS AND MOMENTARY-VOLTAGE-DROP COMPENSATION SYSTEM

(71) Applicant: FUJI ELECTRIC CO., LTD., Kawasaki-shi, Kanagawa (JP)

(72) Inventor: Kansuke Fujii, Machida (JP)

(73) Assignee: FUJI ELECTRIC CO., LTD., Kawasaka-Shi, Kanagawa (JP)

( * ) Notice: Subject to any disclaimer, the term of this patent is extended or adjusted under 35 U.S.C. 154(b) by 0 days.

(21) Appl. No.: 16/223,102

(22) Filed: Dec. 17, 2018

(65) Prior Publication Data
US 2019/0199198 A1 Jun. 27, 2019

(30) Foreign Application Priority Data
Dec. 25, 2017 (JP) ................. 2017-247232

(51) Int. Cl.
| H02M 1/10 | (2006.01) |
| H02M 5/453 | (2006.01) |
| H02M 7/483 | (2007.01) |
| H02M 7/537 | (2006.01) |
| H02M 3/335 | (2006.01) |
| H02J 9/06 | (2006.01) |
| H02M 5/458 | (2006.01) |
| H02M 1/32 | (2007.01) |

(52) U.S. Cl.
CPC ............. *H02M 1/10* (2013.01); *H02J 9/061* (2013.01); *H02J 9/062* (2013.01); *H02M 3/33507* (2013.01); *H02M 5/453* (2013.01); *H02M 5/4585* (2013.01); *H02M 7/483* (2013.01); *H02M 7/537* (2013.01); *H02J 9/068* (2020.01); *H02M 1/32* (2013.01)

(58) Field of Classification Search
CPC .... H02M 1/10; H02M 3/33507; H02M 5/453; H02M 7/483; H02M 7/537; H02J 9/061
USPC ......................................................... 363/142
See application file for complete search history.

(56) References Cited

U.S. PATENT DOCUMENTS
2017/0163088 A1* 6/2017 Toyoda ................. H02J 7/0068

FOREIGN PATENT DOCUMENTS
| JP | H11-341686 A | 12/1999 |
| JP | 2007-252164 A | 9/2007 |

* cited by examiner

*Primary Examiner* — Shawki S Ismail
*Assistant Examiner* — Monica Mata
(74) *Attorney, Agent, or Firm* — Rabin & Berdo, P.C.

(57) ABSTRACT

A momentary-voltage-drop compensation apparatus interconnecting a power system and a DC power supply to a load. The apparatus includes a system interconnection switch connected between the power system and the load, a first power converter that performs DC-AC conversion to DC power of the DC power supply, a second power converter that includes a first terminal connected to the first power converter and the DC power supply, and a second terminal connected between the system interconnection switch and the power system, for performing AC-DC conversion to the AC power supplied from the power system, and a control unit that is connected to the first power converter, and is configured to control, in response to a voltage drop in the power system, the first power converter to output a zero-phase current, a current value of which is no larger than that of a current flowing through the system interconnection switch.

7 Claims, 7 Drawing Sheets

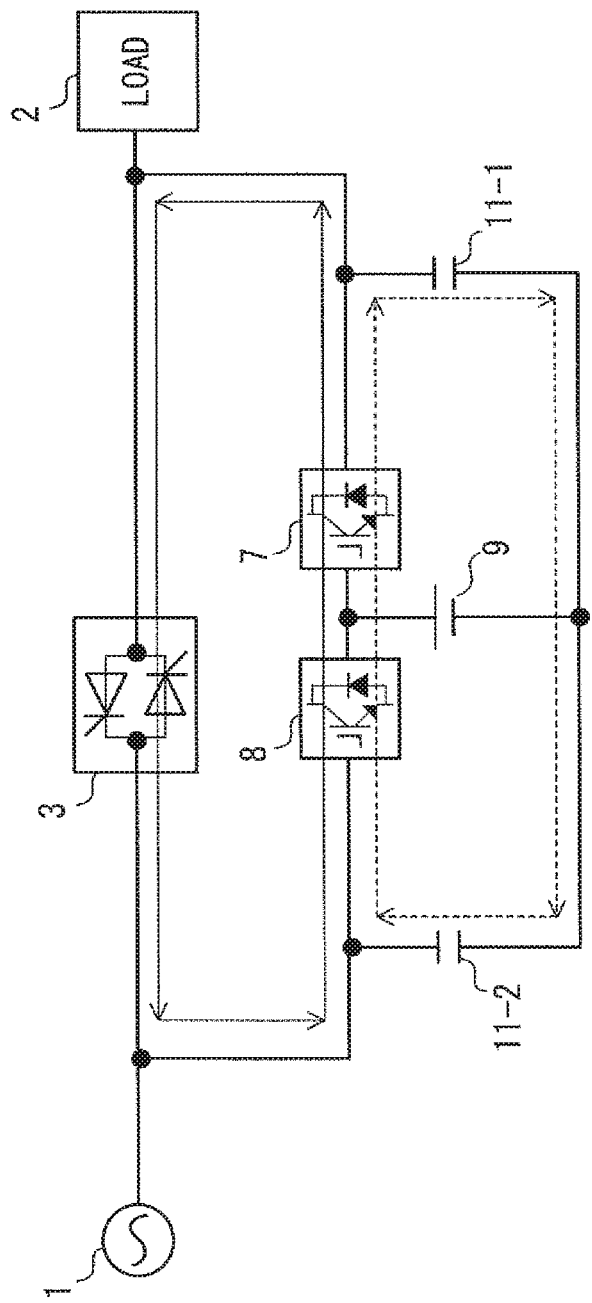
F I G. 3

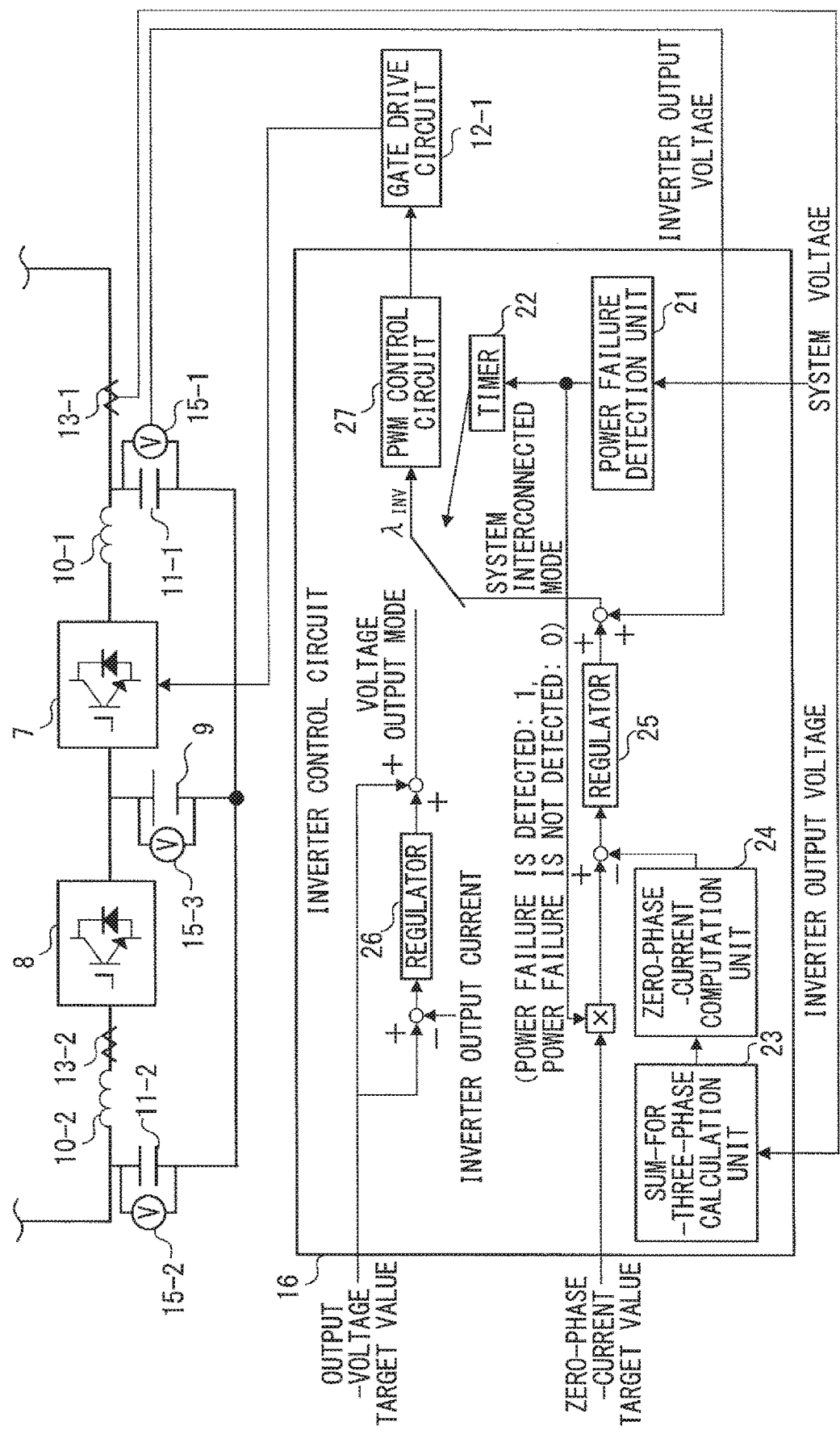
F I G. 5

MOMENTARY-VOLTAGE-DROP COMPENSATION APPARATUS AND MOMENTARY-VOLTAGE-DROP COMPENSATION SYSTEM

CROSS-REFERENCE TO RELATED APPLICATION

This application is based upon and claims the benefit of priority from the prior Japanese Patent Application No. 2017-247232 filed on Dec. 25, 2017, the entire contents of which are incorporated herein by reference.

BACKGROUND OF THE INVENTION

1. Field of the Invention

The present invention relates to a momentary-voltage-drop compensation apparatus and a momentary-voltage-drop compensation system.

2. Description of Related Art

In a case where a switch without a self-arc-extinguishing capability is used as a system interconnection switch in a system using a momentary-voltage-drop compensation system that supplies power to a load by interconnecting a power system and a DC power supply such as a storage battery, when a power failure has occurred due to a short circuit or the like, it could take a time of about one cycle of the power system before the current of the system interconnection switch becomes 0 [A] and the switch is thus turned off. When a power failure has occurred, the system interconnection switch needs to be immediately turned off to soon resume an autonomous operation relying on the DC power supply.

As a related technique, a technique has been proposed wherein when an abnormality in a power system has been detected, the current of a power converter is changed to decrease the value of a current flowing through a system interconnection switch (see, for example, Japanese Laid-open Patent Publication No. 11-341686).

As another related technique, a technique has been proposed wherein a circuit is provided in parallel with a mechanical semiconductor switch 3 or a semiconductor switch 3 without a self-arc-extinguishing capability, and an AC reactor is connected in series to the switch (see, for example, patent document 2 (Japanese Laid-open Patent Publication No. 2007-252164)).

BRIEF SUMMARY OF THE INVENTION

According to an aspect of the embodiments, a momentary-voltage-drop compensation apparatus that includes a system interconnection switch connected between a power system and a load, a DC power supply that supplies power to the load, a first power converter that converts DC power of the DC power supply into AC power, a second power converter that includes one terminal connected to the first power converter and the DC power supply and another terminal connected between the system interconnection switch and the power system, the second power converter converting AC power supplied from the power system into DC power, and a control unit that controls, in response to a voltage drop in the power system, the first power converter so as to output a zero-phase current, a current value of the zero-phase current is equal to or greater than a current value of a current flowing through the system interconnection switch.

BRIEF DESCRIPTION OF DRAWINGS

FIG. 3 is a schematic view illustrating current paths in a momentary-voltage-drop compensation system in accordance with an embodiment;

FIG. 5 is a block diagram illustrating a detailed configuration of an inverter control circuit;

DETAILED DESCRIPTION OF THE INVENTION

Figure 1:
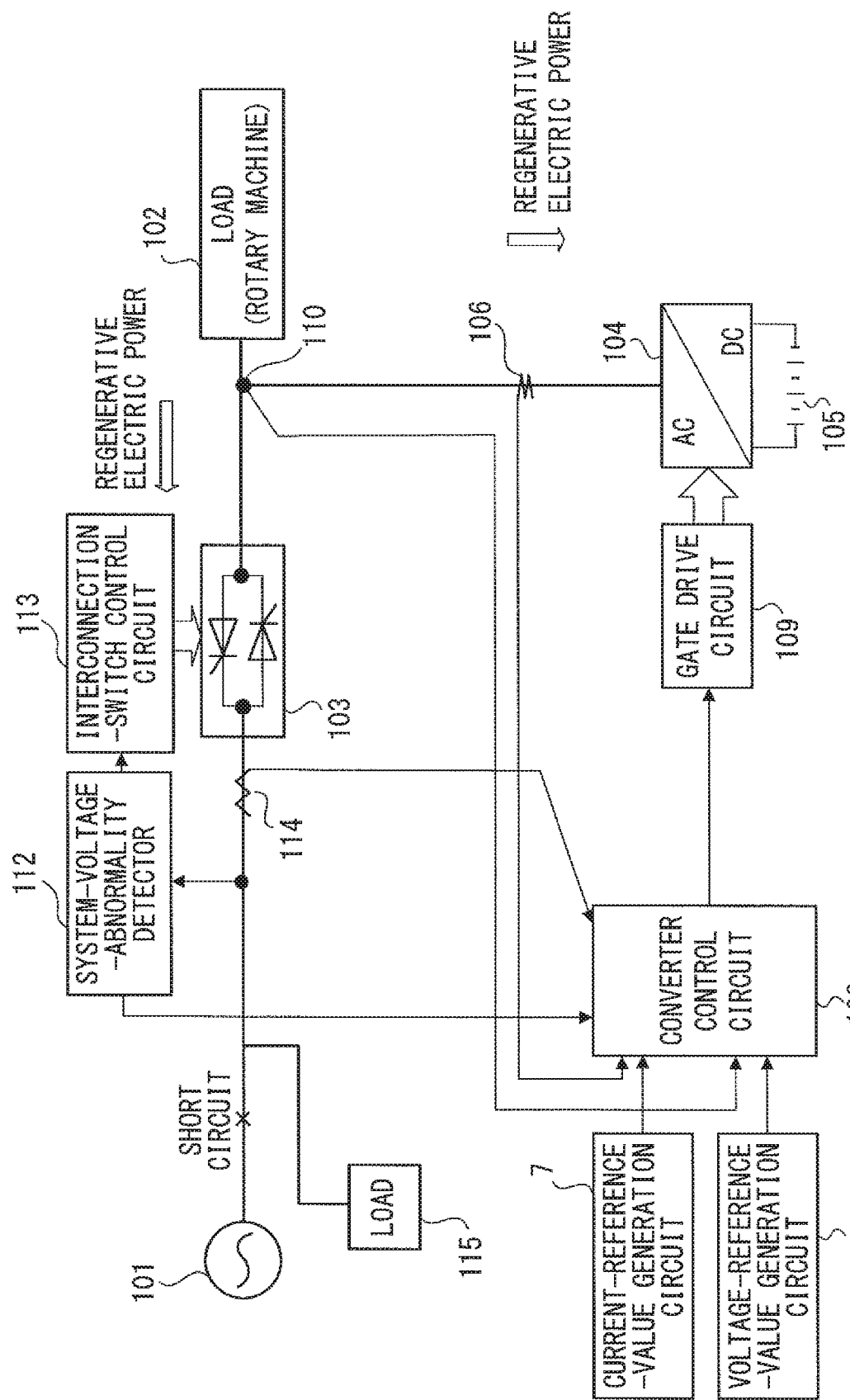
FIG. 1 illustrates a momentary-voltage-drop compensation system in accordance with a related technique.

FIG. 1 illustrates a momentary-voltage-drop compensation system in accordance with a related technique. The circuit depicted in FIG. 1 is similar to that depicted in FIG. 1 of Japanese Laid-open Patent Publication No. 11-341686 excluding some portions, and detailed descriptions of thereof are omitted herein. In FIG. 1, when a power system 101 is operated normally, a system interconnection switch 103 is energized and supplies power to a load 102. Simultaneously, a power converter 104 performs an operation for charging or discharging a DC power supply 105 (interconnection operation mode). Meanwhile, when an abnormality such as a voltage reduction or a power failure has occurred in the power system 101, the system interconnection switch 103 is turned off, and the load 102 is supplied with power from the DC power supply 105 via the power conversion apparatus 104 (autonomous operation mode). When an abnormality occurs in the power system 101 as described above during the interconnection operation mode, the time required to turn off the system interconnection switch 103 and then shift to the autonomous operation mode needs to fall within a range such that the load 102 is not affected. Assume that the load 102 is a device capable of regenerating power (e.g., a rotary machine). When the power system 101 and the system interconnection switch 103 are short-circuited as indicated in FIG. 1 (including a situation in which the residual voltage is not 0 [V], such as a momentary voltage drop), regenerative electric power flows from the load 102 to an upper-level load 115 and the point of the short circuit.

Subsequently, a current (regenerative current) resulting from the regenerative electric power flows through the system interconnection switch 103, and hence when an attempt is made to set the regenerative current to 0 [A] using the power convertor 104, the regenerative current flows through the power convertor 104. The charging power of the DC power supply 105 connected to the power convertor 104 is typically ¹⁄₁₀ of the discharging power of the DC power supply 105 or less. Hence, the DC power supply 105 could be incapable of absorbing the regenerative electric power and thus put in an over-DC-voltage state, thereby causing system down.

The present invention in accordance with an aspect provides a momentary-voltage-drop compensation system that enhances the safety in turning off a system interconnection switch when a load that outputs regenerative electric power is included.

Figure 2:
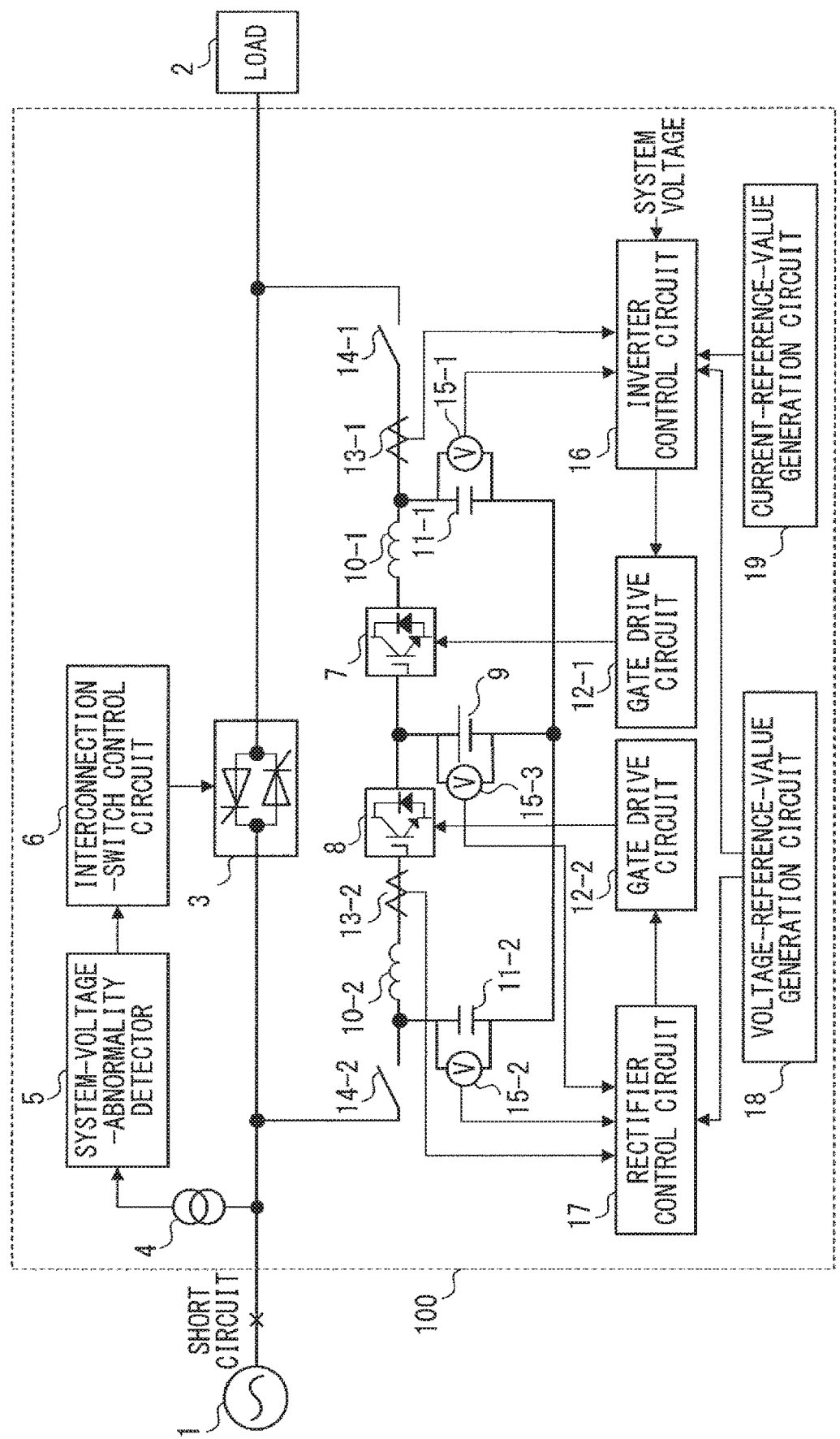
FIG. 2 illustrates the configuration of a momentary-voltage-drop compensation system in accordance with an embodiment.

The following describes embodiments in detail on the basis of the drawings. FIG. 2 illustrates the configuration of a momentary-voltage-drop compensation system in accordance with an embodiment. Although the momentary-voltage-drop compensation system in accordance with the embodiment has a three-phase structure, FIG. 2 represents the lines of each of the three phases as one line. A momentary-voltage-drop compensation apparatus 100 is connected to a power system 1 and a load 2. The load 2 is, for example, a rotary machine capable of outputting regenerative electric power.

A system interconnection switch 3 is connected between the power system 1 and the load 2, and a series circuit consisting of a rectifier 8 and an inverter 7 is connected in parallel to the system interconnection switch 3 via switches 14-1 and 14-2. A filter circuit comprising an inductor 10-2 and a capacitor 11-2 and a filter circuit comprising an inductor 10-1 and a capacitor 11-1 are respectively connected to the rectifier 8 and the inverter 7. In addition, one end of a DC power supply 9 is connected to a DC section between the rectifier 8 and the inverter 7, and another end of the DC power supply 9 is connected to the capacitors 11-1 and 11-2 by a virtual neural line.

When the power system 1 is operated soundly, the power system 1 supplies power to the load 2 via the system interconnection switch 3. When an abnormality such as momentary drop of the voltage of the power system 1 has occurred, power conversion occurs on a path extending via the rectifier 8 and the inverter 7, and the power is then supplied to the load 2. In addition, when a power failure has occurred in the power system 1, the system interconnection switch 3 is turned off, and the power of the DC power supply 9 undergoes the power conversion at the inverter 7 and is then supplied to the load 2.

The system interconnection switch 3 is connected to the power system 1 and the load 2. The system interconnection switch 3 comprises a thyristor or a semiconductor element without a self-arc-extinguishing capability, such as a mechanical switch.

A system voltage abnormality detector 5 obtains an output voltage from a transformer 4 so as to detect an abnormality in a system voltage, such as a momentary voltage drop, and transmits an abnormality signal to an interconnection-switch control circuit 6.

Upon receipt of the abnormality signal indicating an abnormality in the system voltage, the interconnection-switch control circuit 6 turns off the system interconnection switch 3. When, for example, an abnormality signal is no longer received, the interconnection-switch control circuit 6 turns on the system interconnection switch 3 through a reclosing sequence. The reclosing sequence has no relevance to the present invention, and descriptions thereof are omitted herein. In the present embodiment, regenerative electric power flows from the load 2 to a load (not illustrated) connected to the side on which the point of the short circuit and the power system 1 are located.

A closed circuit that includes the DC power supply 9, the inverter 7, the inductor 10-1, and the capacitor 11-1 is connected in parallel to the system interconnection switch 3. An ammeter 13-1 that detects the output current of the inverter 7 is connected to the inverter 7 via the inductor 10-1.

When a voltage drop in the power system 1 has been detected, the inverter 7 outputs a zero-phase current to set the current of the system interconnection switch 3 to 0 on the basis of a gate signal output by a gate drive circuit 12-1. In particular, the inverter 7 sets the current of the system interconnection switch 3 to 0 by outputting to the system interconnection switch 3 a zero-phase current, the amplitude value of the zero-phase current is equal to or greater than the amplitude value of a current flowing through the system interconnection switch 3. When a predetermined period of time has elapsed since the detection of the abnormality in the power system, the inverter 7 stops outputting the zero-phase current and outputs to the load 2 an alternating current obtained by applying DC-AC conversion to the current from the DC power supply 9. The predetermined period of time corresponds to, for example, one cycle of the zero-phase current. The output value of the zero-phase current is set according to an inverter control circuit 16 on the basis of a zero-phase-current target value that depends on the rated current of the load 2. The inverter 7 is an example of the first power converter.

The inverter 7 causes a zero-phase current to flow such that the output power behaves like simple pulsating power, and the regenerative electric power does not flow into the DC power supply 9.

The zero-phase current, which is achieved when currents with the same phase and value flow through the individual lines of the three phases, is calculated by multiplying the sum of the phase currents by ⅓.

The DC power supply 9 is, for example, a storage battery such as a lithium-ion battery or a lead storage batter. The DC power supply 9 supplies power to the load 2 via the inverter 7 through system interconnection.

The switch 14-1 is provided between the inverter 7 and the load 2. The switch 14-1 is typically controlled in ON state and put in OFF state when, for example, the inverter 7 has failed. A voltmeter 15-1 that detects the output voltage of the inverter 7 is installed at both ends of the capacitor 11-1.

In addition, a closed circuit that includes the DC power supply 9, the rectifier 8, the inductor 10-2, and the capacitor 11-2 is connected in parallel to the system interconnection switch 3. The rectifier 8 includes one terminal connected to the inverter 7 and the DC power supply 9 and another terminal connected between the system interconnection switch 3 and the power system 1. An ammeter 13-2 that detects the output current of the rectifier 8 is connected to the rectifier 8 via the inductor 10-2. The switch 14-2 is also connected to the rectifier 8 via the inductor 10-2. The switch 14-2 is typically controlled in ON state. A voltmeter 15-2 that detects the output voltage of the rectifier 8 is installed at both ends of the capacitor 11-2. The rectifier 8 converts AC power supplied from the power system 1 into DC power. The rectifier 8 is an example of the second power converter.

The gate drive circuit 12-1 amplifies a current of a pulse-width-modulation (PWM) signal input from the inverter control circuit 16 and outputs a gate signal based on the PWM signal to the inverter 7. A gate drive circuit 12-2 amplifies a current of a PWM signal input from a rectifier control circuit 17 and outputs a gate signal based on the PWM signal to the rectifier 8. The inverter control circuit 16, the rectifier control circuit 17, the gate drive circuit 12-1, and the gate drive circuit 12-2 correspond to the control unit.

In a voltage output mode, i.e., an operation mode set in an autonomous operation for supplying power from the DC power supply 9 to the load 2, the inverter control circuit 16 outputs a PWM signal to the gate drive 12-1 on the basis of an inverter output voltage detected by the voltmeter 15-1 and an output-voltage target value input from a voltage-reference-value generation circuit 18. In a system interconnected mode for supplying power from the power system 1 to the load 2, when an abnormality such as a power failure has occurred in the power system 1, the inverter control circuit 16 detects avoltage drop (power failure) on the basis of a system voltage detected by the transformer 4 and outputs a PWM signal to the gate drive 12-1 on the basis of an inverter output current detected by the ammeter 13-1, an inverter output voltage detected by the voltmeter 15-1, and a zero-phase-current target value depending on the rated current of the load 2 that has been input from a current-reference generation circuit 19. Details of the control of the inverter control circuit 16 will be described hereinafter.

The rectifier control circuit 17 outputs a PWM signal to the gate drive 12-2 on the basis of an output current of the rectifier 8 detected by the ammeter 13-2, an output voltage of the rectifier 8 detected by the voltmeter 15-2, and a DC-voltage target value input from the voltage-reference-value generation circuit 18. While power is supplied from the DC power supply 9 to the load 2, the rectifier control circuit 17 controls the rectifier 8 so as to convert the AC power of the power system 1 into DC power and to supply the converted power to the inverter 7. Details of the control of the rectifier control circuit 17 will be described hereinafter.

When the power system 1 has a residual voltage that is several tens of percent of the full voltage during occurrence of a momentary voltage drop of the power system 1, the momentary-voltage-drop compensation system depicted in FIG. 2 supplies power to the load 2 via the rectifier 8 so that backup can be done with a small DC power supply capacity.

FIG. 3 is a schematic view illustrating current paths of a zero-phase current in a momentary-voltage-drop compensation system in accordance with an embodiment. Although the circuit depicted in FIG. 3 is the same as the momentary-voltage-drop compensation system illustrated in FIG. 2, the components other than the power system 1, the load 2, the system interconnection switch 3, the inverter 7, the rectifier 8, the DC power supply 9, and the capacitors 11-1 and 11-2 are not depicted in FIG. 3.

The solid arrows depicted in FIG. 3 indicates the path of a zero-phase current after a power failure has occurred but before the interconnection switch 3 is turned off. The dashed arrows indicate the path of a zero-phase current after the system interconnection switch 3 has been turned off. As illustrated in FIG. 3, after a power failure has occurred, a zero-phase current flows through the inverter 7, the system interconnection switch 3, and the rectifier 8. After the system interconnection switch 3 has been turned off, a zero-phase current flows through the inverter 7, the capacitors 11-1 and 11-2, and the rectifier 8.

Figure 4:
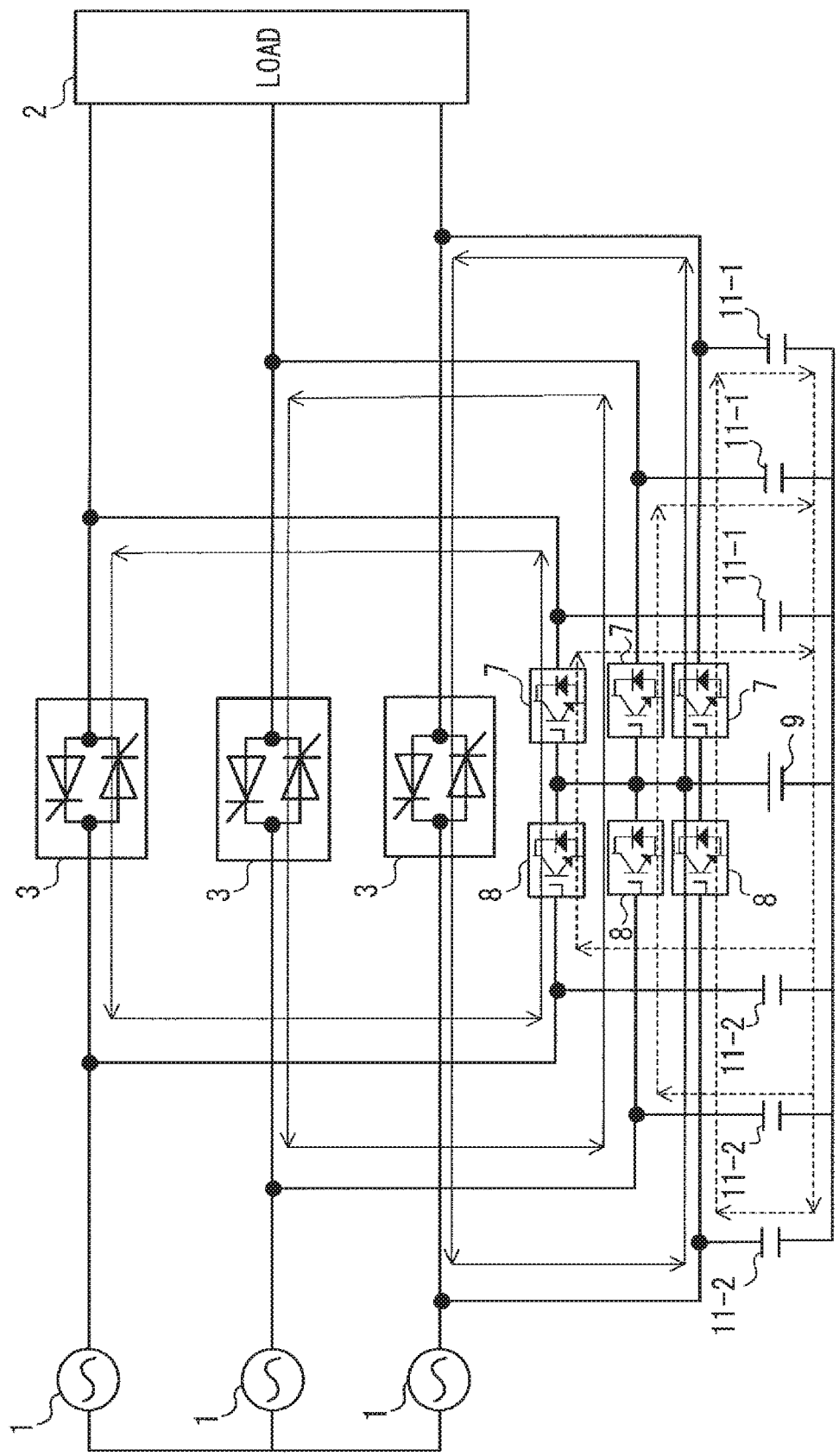
FIG. 4 is a schematic view illustrating current paths of three-phase currents in a momentary-voltage-drop compensation system in accordance with an embodiment.

FIG. 4 is a schematic view illustrating current paths of three-phase currents in a momentary-voltage-drop-compensation power supply system in accordance with an embodiment. Although the circuit depicted in FIG. 4 is the same as the momentary-voltage-drop compensation system illustrated in FIG. 2, FIG. 4 further illustrates individual lines of three phases. The components other than the power system 1, the load 2, the system interconnection switch 3, the inverter 7, the rectifier 8, the DC power supply 9, and the capacitors 11-1 and 11-2 are not depicted in FIG. 4.

The solid arrows depicted in FIG. 4 indicate the paths of a zero-phase current after a power failure has occurred but before the interconnection switches 3 are turned off. The dashed arrows indicate the paths of a zero-phase current after the system interconnection switches 3 have been turned off. As illustrated in FIG. 4, after a power failure has occurred, a zero-phase current flows through, for each of the phases, the inverter 7, the system interconnection switch 3, and the rectifier 8. After the system interconnection switches 3 are turned off, a zero-phase current flows through, for each of the phases, the inverter 7, the capacitors 11-1 and 11-2, and the rectifier 8. The capacitors 11-1 and 11-2 are combined with the inductors 10-1 and 10-2 to form input and output filters for the rectifier 8 and the inverter 7. In the present embodiment, the capacitors 11-1 and 11-2 and the DC power supply 9 are connected by a virtual neural line. The virtual neural line may be hard-wired.

FIG. 5 is a block diagram illustrating the configuration of the inverter control circuit 16. For description, FIG. 5 also depicts some of the components of the momentary-voltage-drop compensation system in addition to the inverter control circuit 16.

A power failure detection unit 21 obtains a system voltage that is the voltage of the power system 1 via the transformer 4 so as to detect whether a power failure has occurred. The power failure detection unit 21 determines that a power failure has occurred when, for example, the system voltage is less than a predetermined value (e.g., a voltage value within a range from 70% to 90% of the rated voltage). A power failure occurs when, for example, a system abnormality has occurred due to a short circuit or the like.

The power failure detection unit 21 may determine, on the basis of an output voltage of the rectifier 8 detected by the voltmeter 15-2, that a power failure has occurred when the output voltage of the rectifier 8 is less than a predetermined value.

A timer 22 starts counting at a point in time at which the power failure detection unit 21 detects a power failure. The inverter control circuit 16 sets the voltage output mode when a predetermined period of time has elapsed after the detection of the power failure by the power failure detection unit 21. The predetermined period of time is, for example, about 1-2 ms. The predetermined period of time may be one cycle of a zero-phase current.

Descriptions will be given of operations performed in the system interconnected mode. As described above, the system interconnected mode is an operation mode performed during a period extending from a time before the detection of a power failure to a predetermined period of time after the detection of the power failure.

The inverter control circuit 16 multiplies a zero-phase-current target value input from the current-reference-value generation circuit 19 by an output value of the power failure detection unit 21. The zero-phase-current target value is set in advance on the basis of the rated current of the load 2. The output value of the power failure detection unit 21 is 1 during a power failure and is 0 otherwise. The inverter control circuit 16 defines the product as a zero-phase-current command value.

A sum-for-three-phase calculation unit 23 calculates the sum of the detected values of the three phases of inverter output currents detected by the ammeter 13-1. A zero-phase-current computation unit 24 determines a zero-phase current by multiplying the sum output by the sum-for-three-phase calculation unit 23 by ⅓.

The inverter control circuit 16 outputs the deviation between the zero-phase-current command value and the current value output by the zero-phase-current computation unit 24 to a regulator 25. The regulator 25 processes the input deviation using feedback control (e.g., P control) so as to calculate a phase-voltage command value. The inverter control circuit 16 sums the phase-voltage command value output by the regulator 25 and the inverter output voltage detected by the voltmeter 15-1 and outputs the sum ($\lambda_{INV}$) to a PWM control circuit 27.

The PWM control circuit 27 generates a PWM signal (pulse signal) on the basis of the input voltage value ($\lambda_{INV}$) and outputs the generated signal to the gate drive circuit 12-1.

Next, descriptions will be given of operations performed in the voltage output mode. The voltage output mode is an operation mode performed when a predetermined period of time has elapsed since detection of a power failure. In the voltage output mode, the system interconnection switch 3 is in OFF state, and power is supplied from the DC power supply 9 to the load 2 via the inverter 7. In particular, an autonomous operation is performed using the DC power supply 9.

The inverter control circuit 16 outputs the deviation between an output-voltage target value input from the voltage-reference-value generation circuit 18 and an inverter output voltage detected by the voltmeter 15-1 to a regulator 26. The regulator 26 processes the input deviation using feedback control (e.g., P control) so as to calculate a phase-voltage command value. The inverter control circuit 16 outputs the sum of the output value of the regulator 26 and the output-voltage target value to the PWM control circuit 27 as $\lambda_{INV}$ for the voltage output mode.

The PWM control circuit 27 generates a PWM signal (pulse signal) on the basis of the input voltage value and outputs the generated signal to the gate drive circuit 12-1.

Figure 6:
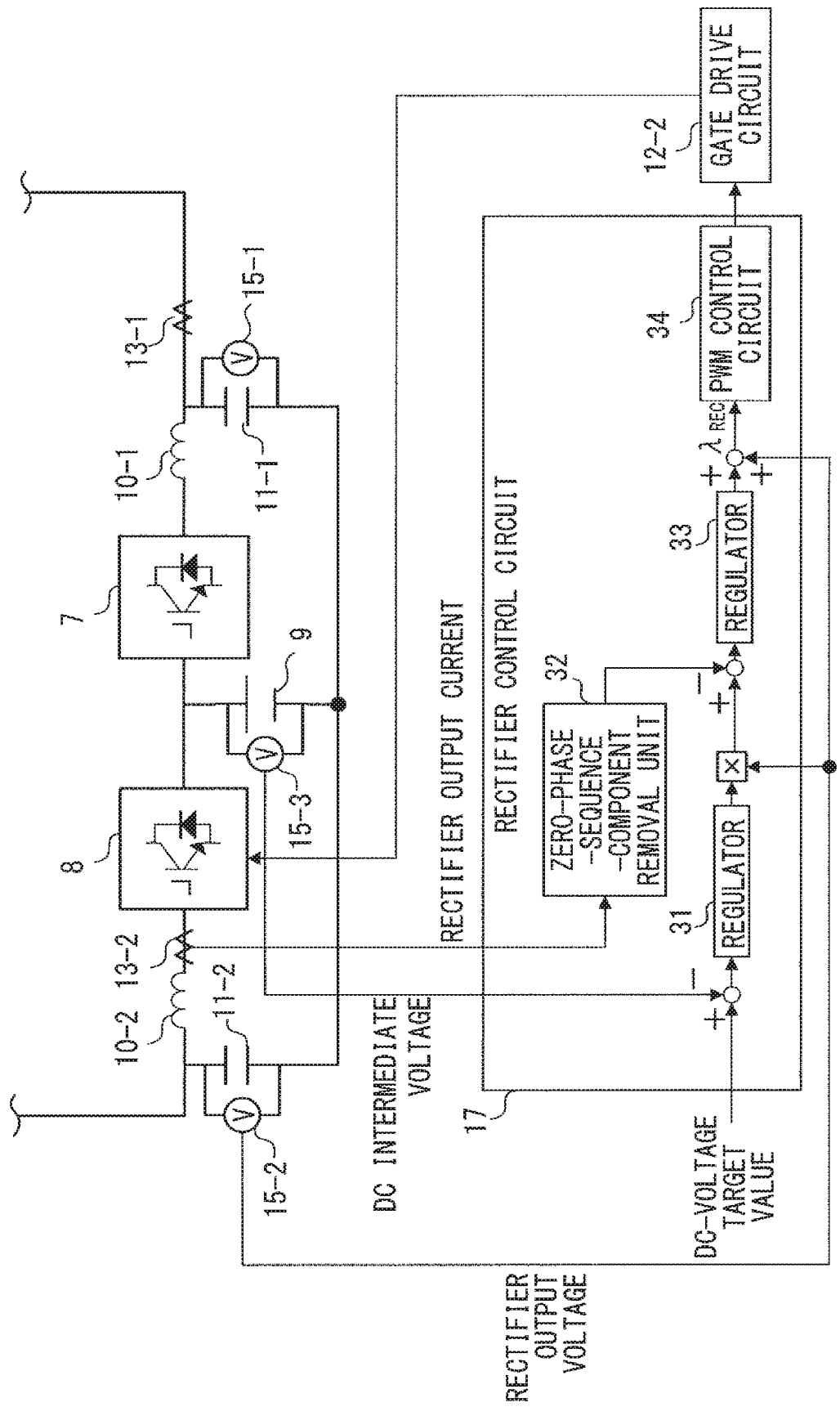
FIG. 6 is a block diagram illustrating a detailed configuration of a rectifier control circuit.

FIG. 6 is a block diagram illustrating the configuration of the rectifier control circuit 17. For description, FIG. 6 also depicts some of the components of the momentary-voltage-drop compensation system in addition to the rectifier control circuit 17.

The rectifier control circuit 17 outputs the deviation between a DC-voltage target value input from the voltage-reference-value generation circuit 18 and the voltage of the DC power supply 9 obtained from the voltmeter 15-3 (DC intermediate voltage) to a regulator 31. The regulator 31 processes the input deviation using feedback control (e.g., PI control) so as to calculate a value indicating the amplitude of the current. The rectifier control circuit 17 multiplies the value output from the regulator 31 by the output voltage of the rectifier 8 detected by the voltmeter 15-2 and defines the product as a current command value.

A zero-phase-sequence-component removal unit 32 removes the current value of a zero-phase-sequence component from a current value obtained from the ammeter 13-2. For example, the zero-phase-sequence-component removal unit 32 may remove the current value of the zero-phase-sequence component by subtracting ⅓ of the sum of the current values of the three phases from the current value of each of the phases.

The rectifier control circuit 17 outputs the deviation between the current command value and the output value of the zero-phase-sequence-component removal unit 32 to a regulator 33. The regulator 33 processes the input deviation using feedback control (e.g., P control) so as to calculate a phase-voltage command value. The rectifier control circuit 17 sums the phase-voltage command value output by the regulator 33 and the output voltage of the rectifier 8 detected by the voltmeter 15-2 and outputs the sum to a PWM control circuit 34 as a voltage value $\lambda_{REC}$.

The PWM control circuit 34 generates a PWM signal (pulse signal) on the basis of the input voltage value $\lambda_{REC}$ and outputs the generated signal to the gate drive circuit 12-2.

The inverter control circuit 16 and the rectifier control circuit 17 may be, for example, central processing units (CPUs), multicore CPUs, or circuits formed using a programmable device (e.g., a field programmable gate array (FPGA) or a programmable logic device (PLD)). For example, the inverter control circuit 16 and the rectifier control circuit 17 may each have a storage unit provided therewithin or outside thereof and may read and execute a control program stored in the storage unit.

Figure 7:
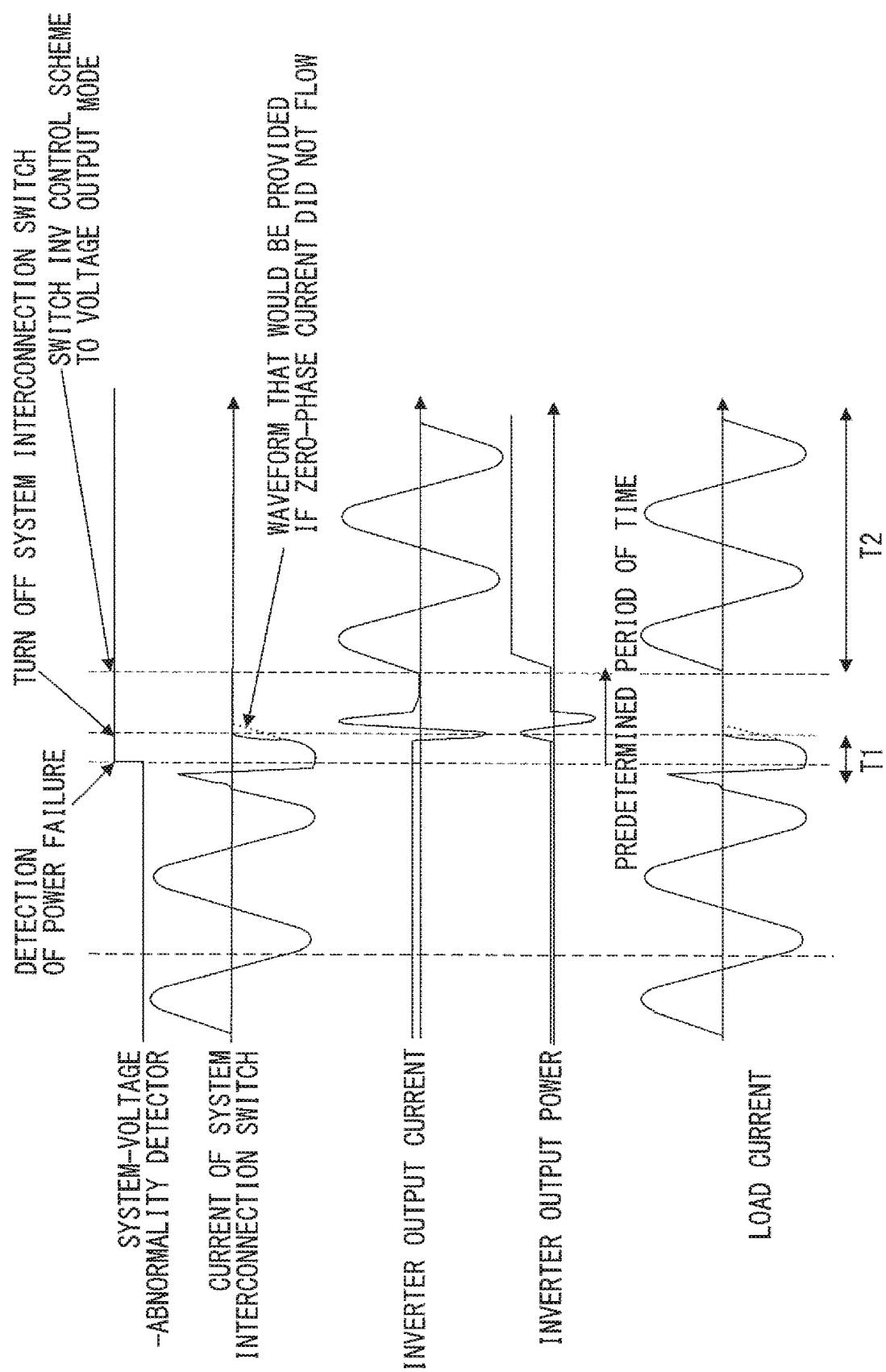
FIG. 7 illustrates current waveforms and electric power waveforms.

FIG. 7 illustrates current waveforms and electric power waveforms. FIG. 7 indicates the respective waveforms of an output value of the system voltage abnormality detector 5, a current value of the system interconnection switch, and an output current of the inverter 7, an inverter output value, and a load current.

As indicated in FIG. 5, when a power failure is detected, a control for generating a zero-phase current based on a zero-phase-current target value is performed, and the zero-phase current is output from the inverter 7. The zero-phase current flows through the system interconnection switch 3 and has an amplitude that is equal to or greater than that of a current flowing through the system interconnection switch 3.

The respective dotted-line portions of the current of the system interconnection switch and the load current depicted in FIG. 7 indicate waveforms that could be provided if the zero-phase current did not flow. As indicated in FIG. 7, the zero-phase current flowing as the inverter output current causes the current of the system interconnection switch 3 to reach 0 [A] earlier than in a situation in which the zero-phase current does not flow. The current of the system interconnection switch 3 may be a current that flows from the power system 1 or may be a regenerative current that flows from the load 2. In either case, the current of the system interconnection switch 3 reaches 0 [A] earlier than in a situation in which the zero-phase current does not flow. In the period indicated by T1 in FIG. 7, regenerative electric power is generated due to a momentary voltage drop, thereby varying the current of the system interconnection switch and the load current. In the period indicated by T2 in FIG. 7, the load 2 does not output regenerative electric power and returns to a normal operation in which power is consumed.

When a certain period of time has elapsed since the detecting of the power failure, the control scheme of the inverter 7 is switched to the voltage output mode, and an autonomous operation is performed using the DC power supply 9. The flowing zero-phase current prevents regenerative electric power from flowing into the DC power supply 9 so that the autonomous operation can be started safely.

As described above, when an abnormality in the power system is detected, the momentary-voltage-drop compensation system outputs to the system interconnection switch 3 a zero-phase current for setting the current of the system interconnection switch 3 to 0, so that the current of the system interconnection switch 3 can be quickly set to 0 [A]. In addition, the inverter 7 causes a zero-phase current to flow using a zero-phase-current target value that has been set on the basis of the rated current of the load 2, and hence when the load 2 has output regenerative electric power, the regenerative electric power does not flow into the DC power supply 9, so that the DC power supply 9 can be prevented from being put in an over-DC-voltage state. The present embodiment has been described with reference to the momentary-voltage-drop compensation system; however, needless to say, the present embodiment is also applicable to apparatuses with similar configurations such as uninterrupted power supply apparatuses based on an all-time inverter feeding scheme.

The momentary-voltage-drop compensation system can enhance the safety in turning off a system interconnection switch when a load that outputs regenerative electric power is included.

What is claimed is:

1. A momentary-voltage-drop compensation apparatus for supplying power to a load, by interconnecting a power system supplying alternating current (AC) power and a DC power supply supplying direct current (DC) power to the load, the momentary-voltage-drop compensation apparatus comprising:
   a system interconnection switch connected between the power system and the load;
   a first power converter that performs DC-AC conversion to the DC power of the DC power supply;
   a second power converter that includes
      a first terminal connected to the first power converter and the DC power supply, and
      a second terminal connected between the system interconnection switch and the power system,
   the second power converter performing AC-DC conversion to the AC power supplied from the power system; and
   a control unit that is connected to the first power converter, and is configured to control, in response to a detection of a voltage drop in the power system, the first power converter so as to output a zero-phase current, wherein
   the first power converter outputs to the system interconnection switch the zero-phase current responsive to a control signal output by the control unit, a current value of the zero-phase current being equal to or greater than a current value of a current flowing through the system interconnection switch.

2. The momentary-voltage-drop compensation apparatus of claim 1, wherein the control unit includes
   a control circuit that obtains an output current value of the first power converter and a zero-phase-current target value that corresponds to a rated current of the load, and outputs a signal based on the obtained output current value and the obtained zero-phase-current target value, and
   a gate drive circuit that receives the signal output from the control circuit, and outputs a gate signal to the first power converter on the basis of the received signal, the gate signal being the control signal output by the control unit.

3. The momentary-voltage-drop compensation apparatus of claim 1, wherein
   the control unit is further configured to control the first power converter to stop the output of the zero-phase current and to supply the DC power from the DC power supply to the load, responsive to elapse of a predetermined period of time since the detection of the voltage drop in the power system.

4. The momentary-voltage-drop compensation apparatus of claim 3, wherein
   the predetermined period of time corresponds to one cycle of the zero-phase current.

5. The momentary-voltage-drop compensation apparatus of claim 1, wherein
   the control unit is further connected to the second power converter, and is configured to, while the DC power is supplied from the DC power supply to the load, control the second power converter to convert the AC power of the power system, and to supply the converted power to the first power converter.

6. The momentary-voltage-drop compensation apparatus of claim 1, wherein
   the system interconnection switch includes a semiconductor element without a self-arc-extinguishing capability.

7. A momentary-voltage-drop compensation system comprising the momentary-voltage-drop compensation apparatus of claim 1.

* * * * *